(12) United States Patent
Lefever et al.

(10) Patent No.: US 10,025,878 B1
(45) Date of Patent: Jul. 17, 2018

(54) DATA LINEAGE ANALYSIS

(71) Applicant: Google LLC, Mountain View, CA (US)

(72) Inventors: Ryan Michael Lefever, Mountain View, CA (US); Robbie Alan Haertel, San Jose, CA (US); Deborah Weisser, Palo Alto, CA (US); Long Fei, Campbell, CA (US); William Eric Province, San Jose, CA (US)

(73) Assignee: Google LLC, Mountain View, CA (US)

( * ) Notice: Subject to any disclaimer, the term of this patent is extended or adjusted under 35 U.S.C. 154(b) by 708 days.

(21) Appl. No.: 14/538,607

(22) Filed: Nov. 11, 2014

(51) Int. Cl.
*G06F 17/30* (2006.01)
(52) U.S. Cl.
CPC .......................... *G06F 17/30958* (2013.01)
(58) Field of Classification Search
CPC ......... G06F 17/30864; G06F 17/30598; G06F 17/30958
USPC .... 704/9, 10, 206, 235, 257; 705/26.7, 7.11, 705/14.45, 14.54, 14.71, 26.41, 37; 706/12, 52, 11, 61
See application file for complete search history.

(56) References Cited

U.S. PATENT DOCUMENTS

| | | | |
|---|---|---|---|
| 6,343,295 B1 | 1/2002 | MacLeod et al. | |
| 6,434,558 B1 | 8/2002 | MacLeod et al. | |
| 7,734,619 B2 | 6/2010 | Vierich et al. | |
| 7,783,650 B2 | 8/2010 | Powers et al. | |
| 8,510,836 B1 | 8/2013 | Nachenberg | |
| 9,225,730 B1* | 12/2015 | Brezinski | G06F 21/00 |
| 2008/0270450 A1* | 10/2008 | Veitch | G06F 17/301 |
| 2013/0018848 A1 | 1/2013 | Velasco | |

FOREIGN PATENT DOCUMENTS

WO 2011/069765 6/2011

OTHER PUBLICATIONS

Sen et al., "Bootstrapping Privacy Compliance in Big Data Systems," SP '14 Proceedings of the 2014 IEEE Symposium on Security and Privacy, pp. 327-342.

* cited by examiner

*Primary Examiner* — Jay A Morrison
*Assistant Examiner* — Ken Hoang
(74) *Attorney, Agent, or Firm* — Fish & Richardson P.C.

(57) ABSTRACT

Methods, systems, and apparatus, including computer programs encoded on computer storage media, for analyzing lineage data. One of the methods includes obtaining data access event information; generating a lineage graph from the data access event information; receiving a data lineage request, wherein the data lineage request is a request for lineage data for a specified data set or a specified software process; traversing the lineage graph to identify nodes and edges in the lineage graph that satisfy the data lineage request; and providing data identifying the nodes and edges that satisfy the data lineage request in response to the request.

20 Claims, 4 Drawing Sheets

DATA LINEAGE ANALYSIS

BACKGROUND

This specification relates to data lineage analysis.

Data lineage analysis generally refers to the practice of analyzing, for a given piece of data, the creation of the piece of data, updates to the piece of data, and other pieces of data that may have been derived from that piece of data. For example, a data lineage analysis system may attempt to identify other pieces of data that a given software process wrote after reading a given piece of data. As another example, the data lineage analysis system may attempt to identify the software process that created a given piece of data and other software processes that subsequently wrote or read the piece of data.

SUMMARY

In general, this specification describes techniques for extracting facts from collections of documents.

In general, one innovative aspect of the subject matter described in this specification can be embodied in methods that include the actions of obtaining data access event information, wherein the data access event information identifies data access events, and for each data access event, a respective software process that performed the data access event and a data set associated with the data access event; generating a lineage graph from the data access event information, wherein the lineage graph is a bipartite graph of data set nodes, process nodes, and edges connecting data set nodes to process nodes, wherein each data set node represents a respective data set identified in the data access event information, each process node represents a respective software process identified in the data access event information, and wherein each edge represents a data access event and connects the process node representing the software process that performed the data access event to the data set node associated with the data access event; receiving a data lineage request, wherein the data lineage request is a request for lineage data for a specified data set or a specified software process; traversing the lineage graph to identify nodes and edges in the lineage graph that satisfy the data lineage request; and providing data identifying the nodes and edges that satisfy the data lineage request in response to the request.

Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. The edges can be directed edges, wherein, for each data access event that is a write of a data set by a software process, the edge representing the data access event is directed from the process node representing the software process to the data set node representing the data set, and wherein, for each data access event that is a read of a data set by a software process, the edge representing the data access event is directed from the data set node representing the data set to the process node representing the software process. The data access event information can further include, for each data access event, time stamp data that identifies a time that the data access event occurred, and wherein generating the lineage graph further comprises associating each edge with the time stamp data for the data access event represented by the edge.

The data lineage request can be a request for software processes that have read from or written to a specified data set during a particular period of time, and traversing the lineage graph can include: identifying a first data set node that represents the specified data set; identifying process nodes that are connected to the first data set node by an edge; and determining that process nodes that are connected to the first data set node by an edge that has associated time stamp data that is in the particular period of time satisfy the request.

The data lineage request can be a request for data sets that have been read from or written by a specified software process during a particular period of time, and traversing the lineage graph can include: identifying a first process node that represents the specified software process; identifying data set nodes that are connected to the first process node by an edge; and determining that data set nodes that are connected to the first process node by an edge that has associated time stamp data that is in the particular period of time satisfy the request.

The data lineage request can be a request for data sets that have been derived from a specified data set after a particular time, and traversing the lineage graph can include: identifying a first data set node that represents the specified data set; identifying one or more directed paths in the lineage graph that start at the first data set node and end at a data set node; determining whether each of the identified directed paths is consistent with respect to time; and determining that each node and each edge along the directed paths that are consistent with respect to time satisfies the request. Determining whether each of the identified directed paths is consistent with respect to time can include: determining whether the edge in the directed path that is connected to the first data set node is associated with time stamp data that is after the particular time; and determining, for each edge subsequent to the edge that is connected to the first data set node along the directed path, whether the time stamp data for the edge is after the time stamp data immediately preceding the edge along the directed path.

The data lineage request can be a request for data sets from which a specified data set has been derived, and traversing the lineage graph can include: identifying a first data set node that represents the specified data set; identifying one or more directed paths in the lineage graph that start at a data set node and end at the first data set node; determining whether each of the identified directed paths is consistent with respect to time; and determining that each node and each edge along the directed paths that are consistent with respect to time satisfies the request.

Providing data identifying the nodes and edges that satisfy the data lineage request in response to the request can include providing data identifying the data access events represented by the edges that satisfy the data lineage request.

The data access event information can further include additional identifying information for each of the data access events, and wherein providing data identifying the data access events comprises providing the additional identifying information. The additional identifying information for each of the data access events can include one or more of: a reference to process code that was executed to cause the data access event to be performed, parameters used to invoke the process code, data identifying access controls for the data set associated with the data access event prior to the data access event, data identifying the access controls after the data access event, data identifying a user who performed the data access event, or data identifying a portion of the data set that was read from or written as part of the data access event.

The data lineage request can be a request to pre-compute lineage data for the specified data set or the specified software process.

Particular embodiments of the subject matter described in this specification can be implemented so as to realize one or more of the following advantages. Analyzing the lineage of a data set using a lineage graph can allow a data lineage system to efficiently and accurately provide information about the lineage of a data set, even when monitoring a large number of data sets that have been created by and may be modified by a large number of different software processes. Additionally, by associating time stamp data with edges in the lineage graph, versioning of data sets can effectively be tracked without the lineage graph being versioned. Additionally, by using the lineage graph, the data lineage system can pre-compute data lineage metrics or other lineage data for some or all of the data sets monitored by the data lineage system, allowing the data lineage system to accurately and rapidly process received requests for lineage data. By using the lineage graph, accurate lineage data can be provided efficiently in order to improve many different applications of lineage analysis. For example, unauthorized data accesses can be effectively tracked, processes that use sensitive data can effectively be tracked, sensitive data can effectively be traced as it propagates through large scale analysis system or systems storing large quantities of data, or raw and derived data can be effectively audited. Additionally, the lineage analysis system can provide auditing trails for data sets and can be used to ensure that user data remains private. Additionally, by using the linage graph, the lineage analysis system can effectively answer questions about one or more of: how a given data set was created, which processes access a given data set, where data propagates in a system managing a large quantity of data, how data is transformed as it propagates through the system, characteristics of a given data set, or time-related issues, e.g., was data deleted, moved, or modified.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
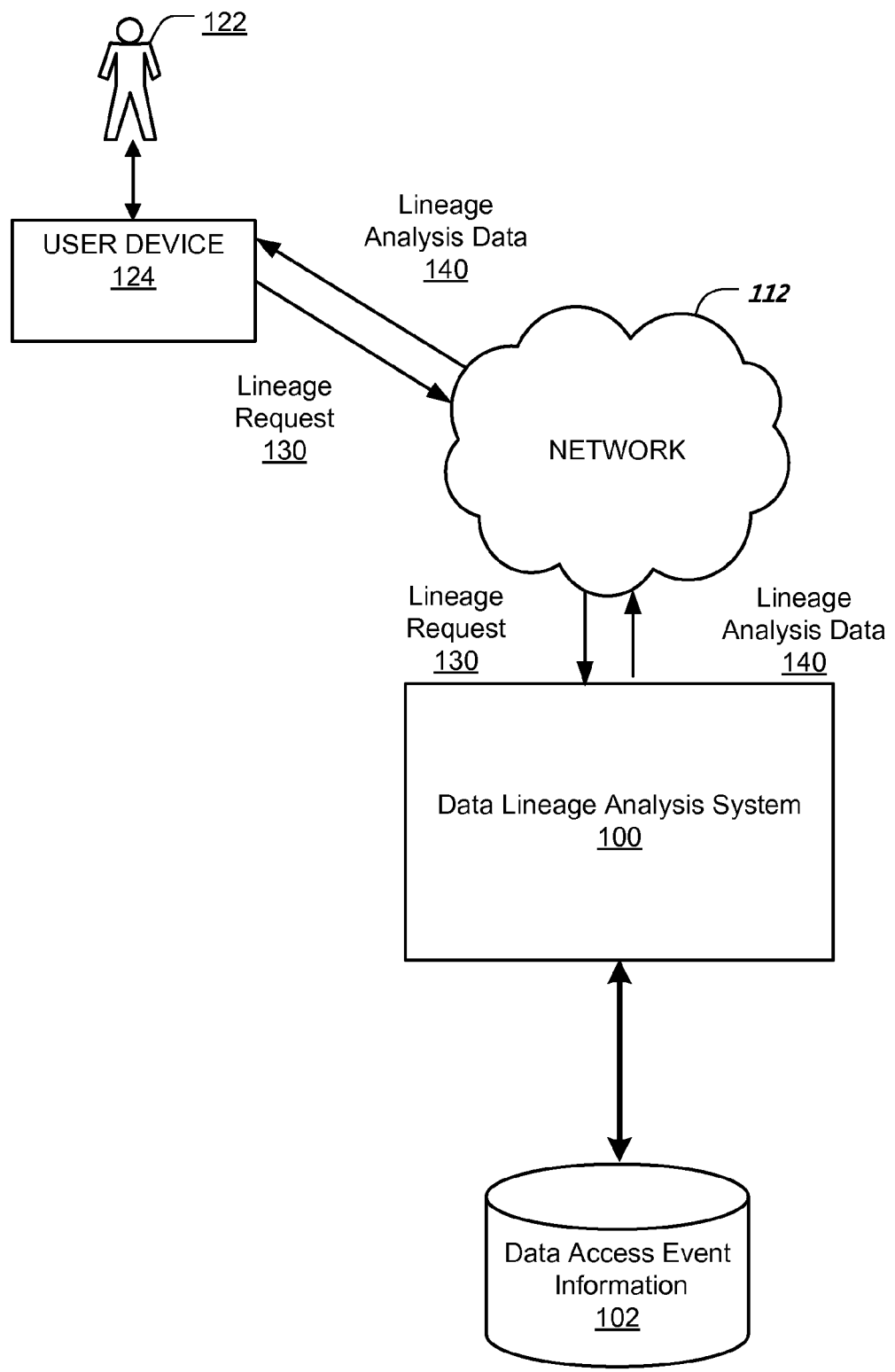
FIG. 1 shows an example data lineage analysis system.

FIG. 1 shows an example data lineage analysis system 100. The data lineage analysis system 100 is an example of a system implemented as computer programs on one or more computers in one or more locations, in which the systems, components, and techniques described below can be implemented.

The data lineage analysis system 100 provides lineage analysis data for various data sets whose lineage is monitored by the data lineage analysis system 100. In general, the data lineage analysis system 100 receives data lineage requests submitted by users of user devices, e.g., a data lineage request 130 submitted by a user 122 of a user device 124, and provides lineage analysis data in response to the received request, e.g., lineage analysis data 140 provided to the user device 124 in response to the data lineage request 130. The user device 124 includes input and output elements through which the device can receive input from and provide output to a user. The user device 124 also includes a communication interface through which the device can send data to, and receive data from, the data lineage analysis system 100. For example, the user device 124 can be a computer, e.g., a personal computer, a smart phone, a personal electronic tablet, and so on, coupled to the data lineage analysis system 100 through a data communication network 112, e.g., local area network (LAN) or wide area network (WAN), e.g., the Internet, or a combination of networks, any of which may include wireless links.

Depending on the context of use of the lineage analysis system 100 and the kind of data lineage request received by the data lineage analysis system 100, the lineage analysis data generated by the lineage analysis system 100 may include different kinds of information characterizing data access events associated with one or more data sets.

In one example context, the data lineage request may be a reachability analysis request to analyze the reachability of a particular data set identified in the received request. For example, the reachability analysis request may be a request to analyze interactions with the particular data set that occurred before a particular point in time. In response such a request, the reachability data provided by the data lineage analysis system 100 may include data characterizing the creation of the data set, e.g., what software process created the data set, and data characterizing subsequent interactions with the data set, e.g., what processes accessed or modified the data set after the data set was created and before the particular point in time. Such lineage analysis data may be used, for example, to recover the state of the data set at the particular time, e.g., if the data set was inadvertently deleted or became corrupted. Such lineage analysis data may also be used, for example, to verify that sensitive data sets were not accessed or modified by users or software processes lacking the necessary permissions to access or modify the data set.

As another example, the reachability analysis request may be a request to analyze, from the particular point in time, what other data sets may have been created or modified using the data in the data set, what data sets may have been created or modified using the data in these other data sets, and so on. In response to such a request, the reachability data provided by the data lineage analysis system 100 may characterize, for one or more software processes that accessed the data set at or after the particular point in time, other data sets written by the software process after accessing the data set. Such lineage analysis data may be used, for example, to determine the data a user or a process generated after accessing data that the process or user lacked the necessary security permissions to access.

As another example, the reachability analysis request may be a request to analyze what data sets a specified data set may have been derived from, i.e., what other data sets were used to generate the data written to the specified data set. In response to such a request, the reachability data provided by the data lineage analysis system 100 may characterize, for one or more software processes that wrote the specified data set, the data sets accessed by those software processes prior to writing the data set and, optionally, for each of those accessed data sets, the other data sets from which the accessed data sets may have been derived.

In another example context, the reachability analysis request may be a request to analyze the data sets interacted with by one or more particular software processes during a particular period of time. In response to such a request, the reachability data provided by the data lineage analysis system 100 may characterize, for each of the particular software processes, the data sets written by the software process or read by the software process during the period of time. Such lineage analysis data may be used, for example, to verify that a particular software process has been accessing the proper data set versions or has not accessed any data sets that the software process lacked permissions to access. Such lineage analysis data may also be used, for example, to improve resource usage, e.g., to change the scheduling of jobs to cluster jobs that read from or write to data stored in similar locations.

Generally, the data lineage analysis system 100 responds to data lineage requests using data access event information 102. The data access event information 102 identifies data access events, i.e., reads from a data set or writes of a data set, and, for each data access event, the software process that performed the data access event and the data set that the data access event is associated with, i.e., the data set that was read from or written by the software process. Depending on the implementation and on the granularity of the data access event information obtained by the data lineage analysis system 100, the data lineage analysis system 100 may consider any of a variety of logical units of data as a data set. For example, in some implementations the data lineage analysis system 100 may consider a single file or a single database table to be a data set. In some other implementations, the data lineage analysis system 100 may use a different level of granularity, however. For example, the data lineage analysis system 100 may consider a portion of a file or a portion of the data in a database table to be a data set. As another example, the data lineage analysis system 100 may consider multiple files or multiple database tables to be a single data set.

The data access event information 102 also includes timestamp data for each data access event that identifies the time that the data access event occurred. Optionally, the data access event information 102 can also include other information characterizing the data access events. For example, the data access event information 102 can include the process code that was executed to cause the data access event to be performed or a pointer or other reference to the process code. As another example, the data access event information 102 can include parameters used to invoke the process code. As another example, the data access event information 102 can include data identifying the access controls for the data set prior to the data access event, after the data access event, or both. As another example, the data access event information 102 can include data identifying the portion of the data set that was read from or written as part of the data access event. As another example, the data access event information 102 can include data identifying the user of the software process, e.g., the user logged in to the computer system on which the software process was executing, at the time the data access event was performed.

In particular, in order to respond to received data lineage requests, the data lineage analysis system 100 generates a data lineage graph using the data access event information 102. Generating a data lineage graph is described in more detail below with reference to FIGS. 2 and 3. In some implementations, the data lineage analysis system 100 pre-computes one or more lineage data metrics or other lineage data for data sets and software processes using the data lineage graph and provides appropriate pre-computed metric values or other lineage data in response to received requests. A lineage data metric may be a value that identifies, for example, how many different processes directly or indirectly accessed a specified data set, how many data sets a process wrote to after reading from a specified data set. Other lineage data may be data identifying the data sets, the processes, and the data access events that make up a path through the lineage graph or a subgraph of the lineage graph. In some other implementations, the data lineage analysis system 100 receives a request, determines lineage data that matches the request and provides the data lineage data in response to the request. Determining lineage data using the data lineage graph is described in more detail below with reference to FIGS. 2 and 4.

Figure 2:
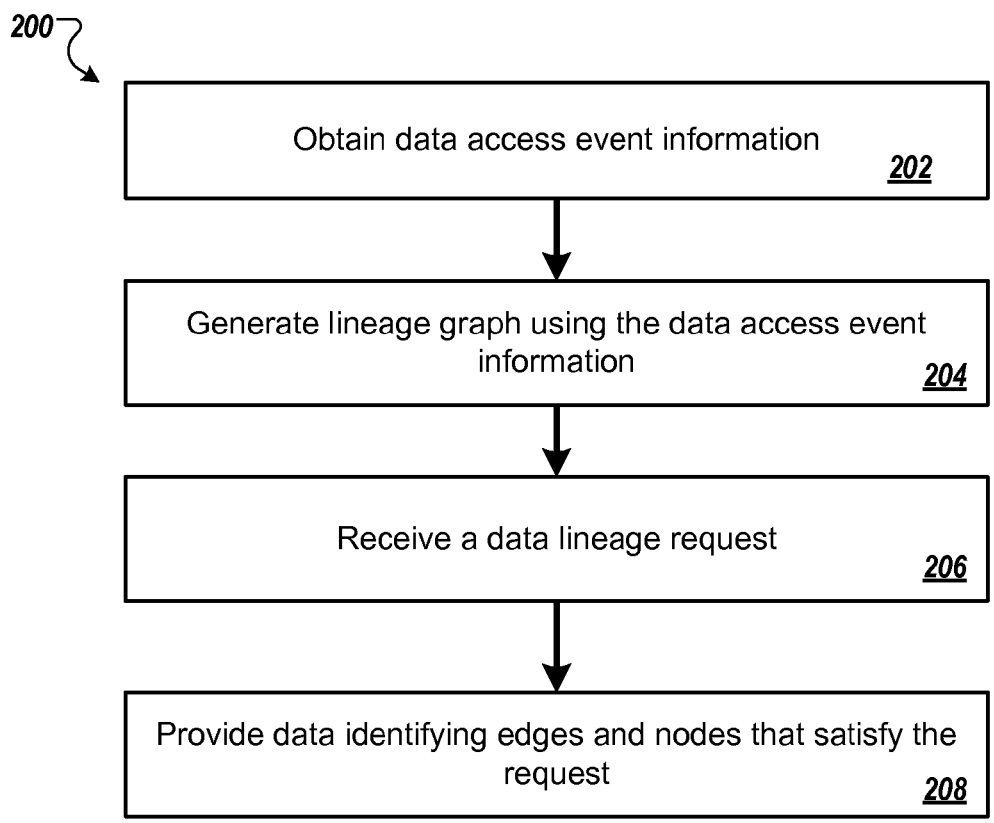
FIG. 2 is a flow diagram of an example process for responding to a data lineage request.

FIG. 2 is a flow diagram of an example process 200 for responding to a data lineage request. For convenience, the process 200 will be described as being performed by a system of one or more computers located in one or more locations. For example, a data lineage analysis system, e.g., the data lineage analysis system 100 of FIG. 1, appropriately programmed in accordance with this specification, can perform the process 200.

The system obtains data access event information (step 202). The system can obtain the data access event information from any of a variety of sources using any of a variety of techniques.

For example, the system can obtain the data access event information from file system or application logs, i.e., logs that identify data access events performed by the application during execution of the application or data access events associated with files managed by the file system.

As another example, the system can obtain the data access event information from data storage systems that store the data sets identified in the data access event information. That is, the data storage systems may be configured to capture information identifying read and write requests directed to data sets stored by the data storage systems and to provide the captured information to the system as data access event information.

As another example, the system can obtain the information from a special-purpose component of an operating system that executes one or more of the software processes identified in the data access event information. That is, the special-purpose component can be configured to capture data identifying input/output (I/O) calls made by the software processes and provide the data to the system as access event information.

The system generates a lineage graph using the obtained data access event information (step 204). The lineage graph is a bipartite graph that has two different types of nodes: data set nodes that represent data sets identified in the data access event information and process nodes that represent the software processes identified in the data access event information. The lineage graph also includes edges connecting nodes in the graph that represent the data access events identified in the data access event information and data associated with the edges in the lineage graph that represents data identifying the data access events represented by the edges. Generating the lineage graph is described in more detail below with reference to FIG. 3. Once generated, the system can store the lineage graph data that corresponds to the nodes, edges, and data associated with the edges of the bipartite graph in any of a variety of ways. For example, the system can store lineage graph data as JavaScript Object Notation (JSON) objects or arrays, in Extensible Markup Language (XML) documents, or in protocol buffers.

The system receives a data lineage request (step 206). Generally, the data lineage request is a request for lineage data for one or more specified software processes or specified data sets over a specified period.

The system provides data identifying the edges and nodes from the lineage graph that satisfy the request in response to the request (step 208). Depending on the request, the system may provide either a lineage metric value or other lineage data in response to the request. A lineage data metric may be a value that identifies, for example, how many different processes directly or indirectly accessed a specified data set, how many data sets a process wrote to after reading from a specified data set. Other lineage data may be data identifying the data sets, the processes, and the data access events that make up a path through the lineage graph or a subgraph of the lineage graph. In some implementations, the system processes the request to identify the edges and nodes in the graph that satisfy the request after the request is received. In some other implementations, the system has pre-computed a data lineage metric or other lineage data that is appropriate for the request, i.e., that identifies the edges and the nodes that satisfy the request. Determining which nodes and edges in the lineage graph satisfy a received request is described in more detail below with reference to FIG. 4.

Figure 3:
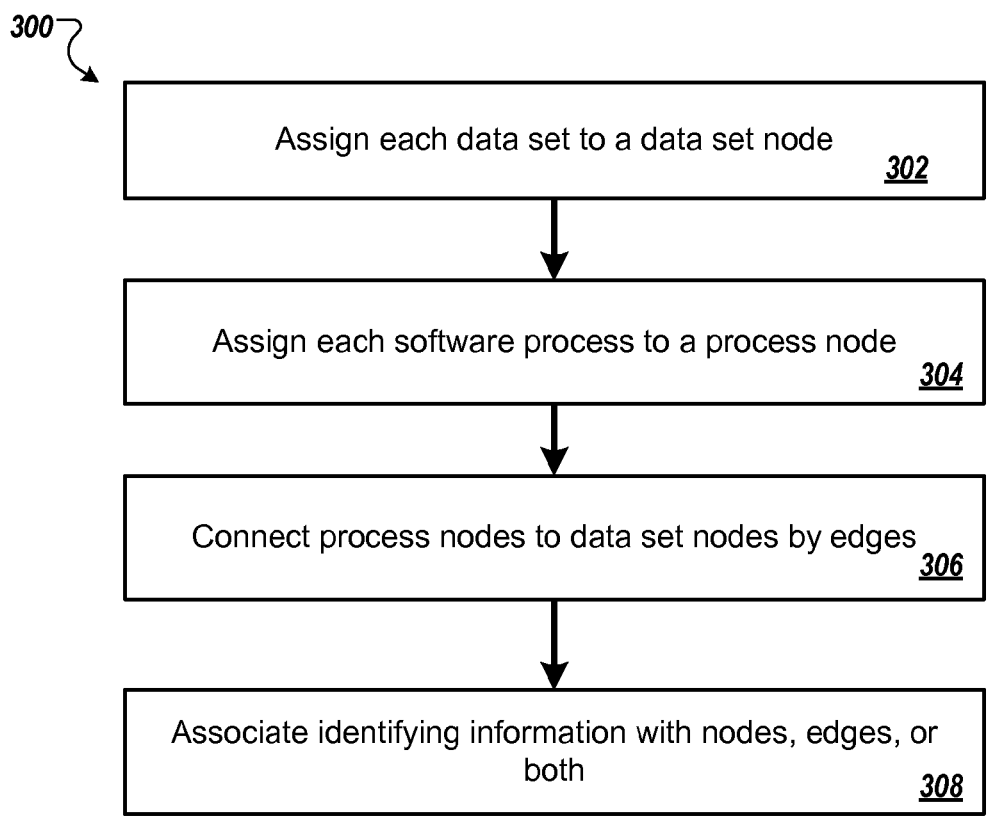
FIG. 3 is a flow diagram of another example process for generating a lineage graph.

FIG. 3 is a flow diagram of an example process 300 for generating a lineage graph. For convenience, the process 300 will be described as being performed by a system of one or more computers located in one or more locations. For example, a data lineage analysis system, e.g., the data lineage analysis system 100 of FIG. 1, appropriately programmed in accordance with this specification, can perform the process 300.

The system assigns each data set identified in the data access event information to a respective data set node in the lineage graph (step 302).

The system assigns each software process identified in the data access event information to a respective process node in the lineage graph (step 304).

For each data access event identified in the data access event, the system connects the process node representing the software process that performed the data access event to the data set node representing the data set associated with the data access event by an edge in the lineage graph (step 306). The edges are directed edges, with the direction of the edge being dependent on whether the data access event was a read from or a write of the data set associated with the data access event. In particular, if the data access event was a read from the data set by the software process, the system connects the node representing the data set to the node representing the software process by an edge that is directed from the node representing the data set to the node representing the software process. If the data access event was a write of the data set by the software process, the system connects the node representing the data set to the node representing the software process by an edge that is directed from the node representing the software process to the node representing the data set.

The system associates identifying information for each data access event with the edge representing the data access event in the lineage graph, the nodes connected by the edge, or both (step 308). In particular, for each data access event, the system associates the timestamp data identified in the data access event information with the edge representing the data access event in the lineage graph, e.g., as metadata. The system can optionally also associate other identifying information for any given data access event with the edge representing the access event or the nodes connected by the edge. For example, the other identifying information can include one or more of: a reference to the process code that was executed to cause the data access event to be performed associated with the process node connected by the edge, parameters used to invoke the process code, data identifying the access controls for the data set prior to the data access event, the access controls after the data access event associated with either the edge or the data set node, data identifying the user of the software process that performed the data access event associated with the software process node, or data identifying the portion of the data set that was read from or written as part of the data access event associated with the edge.

Figure 4:
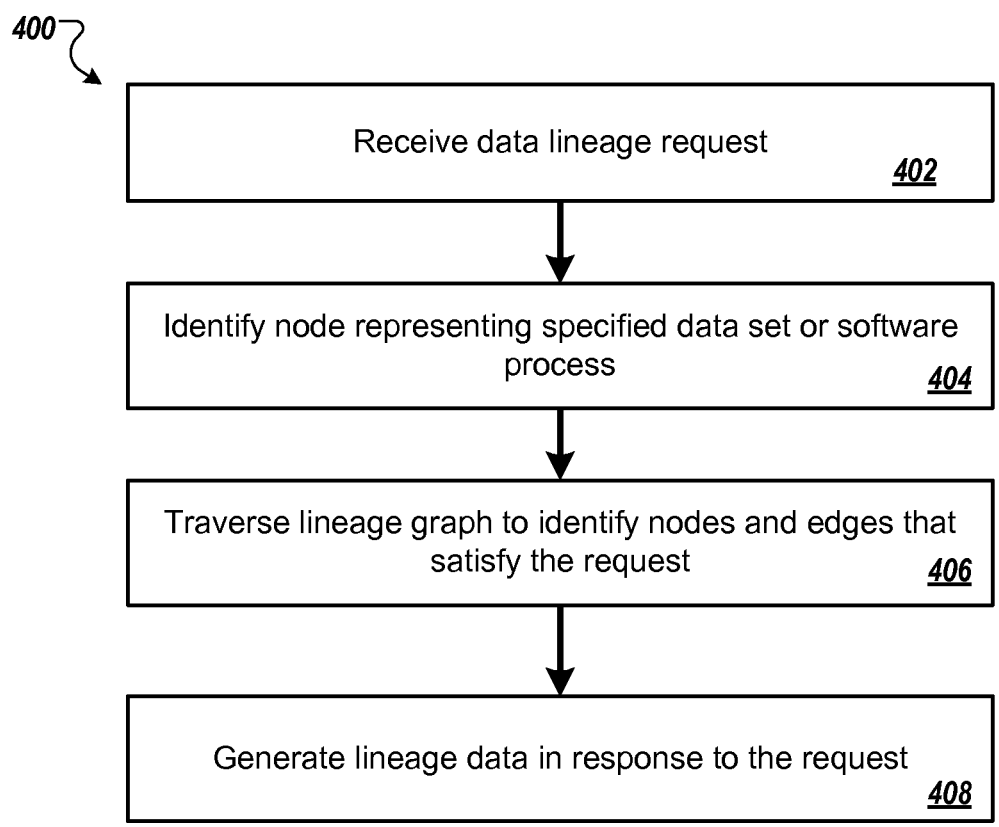
FIG. 4 is a flow diagram of an example process for providing lineage data using a lineage graph.

FIG. 4 is a flow diagram of an example process 400 for determining lineage data using a lineage graph. For convenience, the process 400 will be described as being performed by a system of one or more computers located in one or more locations. For example, a data lineage analysis system, e.g., the data lineage analysis system 100 of FIG. 1, appropriately programmed in accordance with this specification, can perform the process 400.

The system receives a data lineage request for a specified data set or software process (step 402). The request may be a request received from a user device or a request generated by the system in order to pre-compute a lineage metric or other lineage data for the specified data set or software process. In addition to specifying the specified data set or software process, the request also includes parameters that define a specified time period. For example, the request may be a request for lineage data for a specified data set during a specified time period. As another example, the request may be a request for lineage data for a specified software process during a specified time period. The request may define the time period explicitly or implicitly, e.g., from a creation of the specified data set to the current time or for lineage data for a software process subsequent to the process accessing a particular data set.

The system identifies the node representing the specified data set or software process in the lineage graph (step 404). That is, if the request specifies a data set, the system can identify the data set node that represents the specified data set in the lineage graph. If the request specifies a software process, the system can identify the process node that represents the specified process node in the lineage graph.

The system traverses the lineage graph to identify nodes and edges that satisfy the request (step 406).

For example, for a request for software processes that have read from or written to a specified data set during a particular time period, the system can identify each process node that is connected by an edge to the data set node that represents the specified data set. The system can then determine, from time stamp data associated with the edges, which of the data events represented by the edges occurred during the time period specified in the request and the process nodes connected to the data set node by these edges. If the request is only for software processes that have written to the specified data set, the system can identify which edges represent write requests from the direction of the edge in the lineage graph.

Similarly, for a request for data sets that have been read or written by a specified data set during a particular time period, the system can identify each data set node that is connected by an edge to the process node that represents the specified process. The system can then determine, from the time stamp data associated with the edges in the lineage graph, which of the data events represented by the edges occurred during the time period specified in the request and the data set nodes connected to the process node by these edges. If the request is only for data sets that the software processes has written to, the system can identify which edges represent write requests from the direction of the edge in the lineage graph.

As another example, for a request for data sets that may have been derived from a specified data set after a particular point in time, the system may identify directed paths in the logical graph, i.e., paths that include only edges oriented in the same direction, that start with an edge that represents a read of the specified data set and end with another data set. The system can then determine which of the paths are consistent with respect to time, i.e., that start with that an edge that has timestamp data that indicates that the read represented by the edge occurred after the particular point in time and for which each subsequent edge has timestamp data that indicates that the data access event represented by the edge occurred after the data access event represented by the preceding edge on the path. The system can then identify each node and each edge along the paths that are consistent with respect to time as an edge or node that satisfies the request.

As another example, for a request for data from which a specified data set may have been derived, the system may identify directed paths in the logical graph that start with an edge that represents a read of a given data set and end with an edge that represents a write of the specified data set. The system can then determine which of the paths are consistent with respect to time, i.e., paths for which each subsequent edge has timestamp data that indicates that the data access event represented by the edge occurred after the data access event represented by the preceding edge on the path. The system can then identify each node and each edge along the paths that are consistent with respect to time as an edge or node that satisfies the request.

In some implementations, the system can pre-compute multiple shorter paths, e.g., paths that include less than n edges, where n is a small positive integer, e.g., 2, 3, 4, or 5, and, in response to a request that requires the system to identify a path that includes n or more edges, the system can combine multiple pre-computed paths to identify the path that satisfies the request.

The system generates lineage data in response to the request that identifies the nodes and the edges that satisfy the request (step 408). Depending on the request, the lineage data can either be a lineage metric value, data identifying paths through the lineage graph, or data identifying a subgraph of the lineage graph. For example, for each edge that satisfies the request, the system can provide data identifying the data set and the software process connected by the edge and whether the edge represents a read operation or a write operation. The system can also provide some or all of the data associated with the edges that satisfy the request as part of the lineage data. For example, the system can provide the timestamp data associated with edge. If the edges or the nodes are associated with additional data, the system can also provide one or more of: a reference to the process code that was executed to cause the data access event represented by the edge to be performed, parameters used to invoke the process code, data identifying the access controls for the data set prior to the data access event, the access controls after the data access event, data identifying a user who performed the data access event, or data identifying the portion of the data set that was read from or written as part of the data access event. Optionally, the system can order the data events represented by the edges that satisfy the request by their associated time stamps in the response.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
obtaining data access event information, wherein the data access event information identifies data access events, and for each data access event, a respective software process that performed the data access event, a data set associated with the data access event, and time stamp data that identifies a time that the data access event occurred;
generating a lineage graph from the data access event information, wherein the lineage graph is a bipartite graph of data set nodes, process nodes, and directed edges, wherein each directed edge represents a respective data access event identified in the data access event information, wherein each directed edge is associated with time stamp data identifying the time that the data access event represented by the directed edge occurred, wherein each data set node represents a respective data set identified in the data access event information, wherein each process node represents a respective software process identified in the data access event information, wherein for each data access event that is a write of a data set by a software process, the directed edge representing the data access event is directed from the process node representing the software process to the data set node representing the data set, and wherein for each data access event that is a read of a data set by a software process, the directed edge representing the data access event is directed from the data set node representing the data set to the process node representing the software process;

receiving a first data lineage request, wherein the first data lineage request is a request for data sets from which a specified data set has been derived;

traversing the lineage graph to identify data set nodes and directed edges in the lineage graph that satisfy the first data lineage request, comprising:
- identifying a first data set node that represents the specified data set;
- identifying one or more directed paths in the lineage graph that each starts at a respective initial data set node and ends at the first data set node, wherein each directed path includes one or more directed edges oriented in the same direction, and wherein at least one directed edge in each directed path represents a data access event that is a write of data to the first data set node; and
- determining, for each directed edge along each directed path, whether the time stamp data for the directed edge is after the time stamp data for a directed edge immediately preceding the directed edge along the directed path; and providing data identifying the data set nodes and directed edges that satisfy the first data lineage request in response to the first data lineage request.

2. The method of claim 1, further comprising:
receiving a second data lineage request for software processes that have read from or written to a specified data set during a particular period of time;
traversing the lineage graph to identify software processes and directed edges in the lineage graph that satisfy the second data lineage request, comprising:
- identifying a second data set node that represents the specified data set;
- identifying process nodes that are connected to the second data set node by a directed edge; and
- determining that process nodes that are connected to the second data set node by a directed edge that has associated time stamp data that is in the particular period of time satisfy the request; and providing data identifying the nodes and directed edges that satisfy the second data lineage request in response to the second data lineage request.

3. The method of claim 1, further comprising:
receiving a third data lineage request for data sets that have been read from or written by a specified software process during a particular period of time;
traversing the lineage graph to identify data set nodes and directed edges in the lineage graph that satisfy the third data lineage request, comprising:
- identifying a third process node that represents the specified software process;
- identifying data set nodes that are connected to the third process node by a directed edge; and
- determining that data set nodes that are connected to the third process node by a directed edge that has associated time stamp data that is in the particular period of time satisfy the request; and providing data identifying the nodes and directed edges that satisfy the third data lineage request in response to the third data lineage request.

4. The method of claim 1, further comprising:
receiving a fourth data lineage request for data sets that have been derived from a specified data set after a particular time;
traversing the lineage graph to identify data set nodes and directed edges in the lineage graph that satisfy the fourth data lineage request, comprising:
- identifying a fourth data set node that represents the specified data set;
- identifying one or more directed paths in the lineage graph that start at the fourth data set node and end at a data set node;
- determining whether each of the identified directed paths is consistent with respect to time; and
- determining that each node and each directed edge along the directed paths that are consistent with respect to time satisfies the request; and providing data identifying the nodes and directed edges that satisfy the fourth data lineage request in response to the fourth data lineage request.

5. The method of claim 4, wherein determining whether each of the identified directed paths is consistent with respect to time comprises:
- determining whether the directed edge in the directed path that is connected to the fourth data set node is associated with time stamp data that is after the particular time; and
- determining, for each directed edge subsequent to the directed edge that is connected to the fourth data set node along the directed path, whether the time stamp data for the directed edge is after the time stamp data immediately preceding the directed edge along the directed path.

6. The method of claim 1, wherein providing data identifying the nodes and directed edges that satisfy the first data lineage request in response to the first data lineage request comprises providing data identifying the data access events represented by the directed edges that satisfy the first data lineage request.

7. The method of claim 6, wherein the data access event information further comprises additional identifying information for each of the data access events, and wherein providing data identifying the data access events comprises providing the additional identifying information.

8. The method of claim 7, wherein the additional identifying information for each of the data access events comprises one or more of: a reference to process code that was executed to cause the data access event to be performed, parameters used to invoke the process code, data identifying access controls for the data set associated with the data access event prior to the data access event, data identifying the access controls after the data access event, data identifying a user who performed the data access event, or data identifying a portion of the data set that was read from or written as part of the data access event.

9. The method of claim 1, further comprising:
receiving a fifth data lineage request, wherein the data lineage request is a request to pre-compute lineage data for a specified data set or a specified software process, and wherein the data lineage request includes a user-specified number;
identifying one or more directed paths in the data lineage graph, wherein each directed path starts or ends at a node corresponding to the specified data set or the specified software process; and wherein each directed path has the user-specified number of directed edges;
identifying, for each directed path, one or more directed sub-paths, wherein each directed sub-path is a path along the directed path, and wherein each directed sub-path has fewer number of directed edges than the directed path;
generating lineage data for the one or more directed sub-paths; and
providing data identifying the nodes and directed edges that satisfy the fifth data lineage request in response to the fourth data lineage request.

10. A system comprising one or more computers and one or more storage devices storing instructions that when executed by the one or more computers cause the one or more computers to perform operations comprising:
obtaining data access event information, wherein the data access event information identifies data access events, and for each data access event, a respective software process that performed the data access event, a data set associated with the data access event, and time stamp data that identifies a time that the data access event occurred;
generating a lineage graph from the data access event information, wherein the lineage graph is a bipartite graph of data set nodes, process nodes, and directed edges, wherein each directed edge represents a respective data access event identified in the data access event information, wherein each directed edge is associated with time stamp data identifying the time that the data access event represented by the directed edge occurred, wherein each data set node represents a respective data set identified in the data access event information, wherein each process node represents a respective software process identified in the data access event information, wherein for each data access event that is a write of a data set by a software process, the directed edge representing the data access event is directed from the process node representing the software process to the data set node representing the data set, and wherein for each data access event that is a read of a data set by a software process, the directed edge representing the data access event is directed from the data set node representing the data set to the process node representing the software process;
receiving a first data lineage request, wherein the first data lineage request is a request for data sets from which a specified data set has been derived;
traversing the lineage graph to identify data set nodes and directed edges in the lineage graph that satisfy the first data lineage request, comprising:
identifying a first data set node that represents the specified data set;
identifying one or more directed paths in the lineage graph that each starts at a respective initial data set node and ends at the first data set node, wherein each directed path includes one or more directed edges oriented in the same direction, and wherein at least one directed edge in each directed path represents a data access event that is a write of data to the first data set node; and
determining, for each directed edge along each directed path, whether the time stamp data for the directed edge is after the time stamp data for a directed edge immediately preceding the directed edge along the directed path; and
providing data identifying the data set nodes and directed edges that satisfy the first data lineage request in response to the first data lineage request.

11. The system of claim 10, wherein the operations further comprise:
receiving a second data lineage request for data sets that have been derived from a specified data set after a particular time; traversing the lineage graph to identify data set nodes and directed edges in the lineage graph that satisfy the second data lineage request, comprising:
identifying a second data set node that represents the specified data set;
identifying one or more directed paths in the lineage graph that start at the second data set node and end at a data set node;
determining whether each of the identified directed paths is consistent with respect to time; and
determining that each node and each directed edge along the directed paths that are consistent with respect to time satisfies the request; and
providing data identifying the nodes and directed edges that satisfy the second data lineage request in response to the second data lineage request-.

12. The system of claim 11, wherein determining whether each of the identified directed paths is consistent with respect to time comprises:
determining whether the directed edge in the directed path that is connected to the first data set node is associated with time stamp data that is after the particular time; and
determining, for each directed edge subsequent to the directed edge that is connected to the first data set node along the directed path, whether the time stamp data for the directed edge is after the time stamp data immediately preceding the directed edge along the directed path.

13. The system of claim 10, wherein the operations further comprise:
receiving a third data lineage request for data sets that have been read from or written by a specified software process during a particular period of time;
traversing the lineage graph to identify data set nodes and directed edges in the lineage graph that satisfy the third data lineage request, comprising:
identifying a third process node that represents the specified software process;
identifying data set nodes that are connected to the third process node by a directed edge; and
determining that data set nodes that are connected to the third process node by a directed edge that has associated time stamp data that is in the particular period of time satisfy the request; and
providing data identifying the nodes and directed edges that satisfy the third data lineage request in response to the third data lineage request.

14. The system of claim 10, wherein the operations further comprise:
receiving a fourth data lineage request for data sets that have been derived from a specified data set after a particular time;
traversing the lineage graph to identify data set nodes and directed edges in the lineage graph that satisfy the fourth data lineage request, comprising:
identifying a fourth data set node that represents the specified data set;
identifying one or more directed paths in the lineage graph that start at the fourth data set node and end at a data set node;
determining whether each of the identified directed paths is consistent with respect to time; and determining that each node and each directed edge along the directed paths that are consistent with respect to time satisfies the request; and providing data identifying the nodes and directed edges that satisfy the fourth data lineage request in response to the fourth data lineage request.

15. The system of claim 14, wherein determining whether each of the identified directed paths is consistent with respect to time comprises:

determining whether the directed edge in the directed path that is connected to the fourth data set node is associated with time stamp data that is after the particular time; and determining, for each directed edge subsequent to the directed edge that is connected to the fourth data set node along the directed path, whether the time stamp data for the directed edge is after the time stamp data immediately preceding the directed edge along the directed path.

16. The system of claim 15, wherein providing data identifying the nodes and directed edges that satisfy the first data lineage request in response to the first data lineage request comprises providing data identifying the data access events represented by the directed edges that satisfy the first data lineage request.

17. The system of claim 16, wherein the data access event information further comprises additional identifying information for each of the data access events, and wherein providing data identifying the data access events comprises providing the additional identifying information.

18. The system of claim 17, wherein the additional identifying information for each of the data access events comprises one or more of: a reference to process code that was executed to cause the data access event to be performed, parameters used to invoke the process code, data identifying access controls for the data set associated with the data access event prior to the data access event, data identifying the access controls after the data access event, data identifying a user who performed the data access event, or data identifying a portion of the data set that was read from or written as part of the data access event.

19. The system of claim 10, wherein the operations further comprise:

receiving a fifth data lineage request, wherein the data lineage request is a request to pre-compute lineage data for a specified data set or a specified software process, and wherein the data lineage request includes a user-specified number;

identifying one or more directed paths in the data lineage graph, wherein each directed path starts or ends at a node corresponding to the specified data set or the specified software process, and wherein each directed path has the user-specified number of directed edges;

identifying, for each directed path, one or more directed sub-paths, wherein each directed sub-path is a path along the directed path, and wherein each directed sub-path has fewer number of directed edges than the directed path;

generating lineage data for the one or more directed sub-paths; and providing data identifying the nodes and directed edges that satisfy the fifth data lineage request in response to the fourth data lineage request.

20. A computer storage medium encoded with a computer program, the computer program storing instructions that when executed by one or more computers cause the one or more computers to perform operations comprising:

obtaining data access event information, wherein the data access event information identifies data access events, and for each data access event, a respective software process that performed the data access event, a data set associated with the data access event, and time stamp data that identifies a time that the data access event occurred;

generating a lineage graph from the data access event information, wherein the lineage graph is a bipartite graph of data set nodes, process nodes, and directed edges, wherein each directed edge represents a respective data access event identified in the data access event information, wherein each directed edge is associated with time stamp data identifying the time that the data access event occurred, wherein each data set node represents a respective data set identified in the data access event information, wherein each process node represents a respective software process identified in the data access event information, wherein for each data access event that is a write of a data set by a software process, the directed edge representing the data access event is directed from the process node representing the software process to the data set node representing the data set, and wherein for each data access event that is a read of a data set by a software process, the directed edge representing the data access event is directed from the data set node representing the data set to the process node representing the software process;

receiving a first data lineage request, wherein the first data lineage request is a request for data sets from which a specified data set has been derived;

traversing the lineage graph to identify data set nodes and directed edges in the lineage graph that satisfy the first data lineage request, comprising:

identifying a first data set node that represents the specified data set;

identifying one or more directed paths in the lineage graph that each starts at a respective initial data set node and ends at the first data set node, wherein each directed path includes one or more directed edges oriented in the same direction, and wherein at least one directed edge in each directed path represents a data access event that is a write of data to the first data set node; and determining, for each directed edge along each directed path, whether the time stamp data for the directed edge is after the time stamp data for a directed edge immediately preceding the directed edge along the directed path; and providing data identifying the data set nodes and directed edges that satisfy the first data lineage request in response to the first data lineage request.

* * * * *

UNITED STATES PATENT AND TRADEMARK OFFICE
CERTIFICATE OF CORRECTION

PATENT NO. : 10,025,878 B1
APPLICATION NO. : 14/538607
DATED : July 17, 2018
INVENTOR(S) : Lefever et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 812 days.

Signed and Sealed this
Twenty-seventh Day of August, 2019

Andrei Iancu
*Director of the United States Patent and Trademark Office*